C. B. CORCORAN.
TYPE WRITING MACHINE.
APPLICATION FILED JAN. 4, 1917.

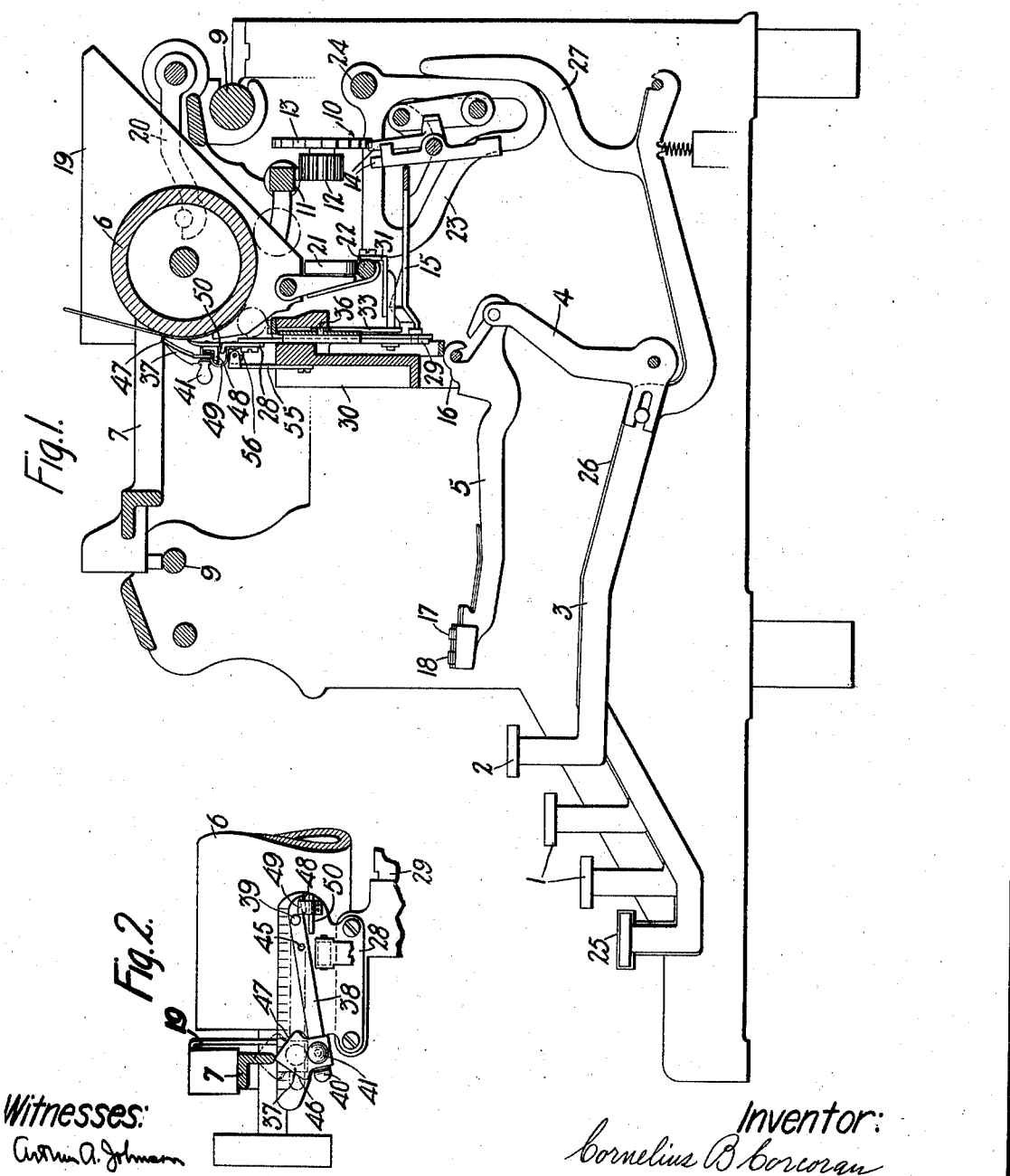

1,312,162.

Patented Aug. 5, 1919.
3 SHEETS—SHEET 2.

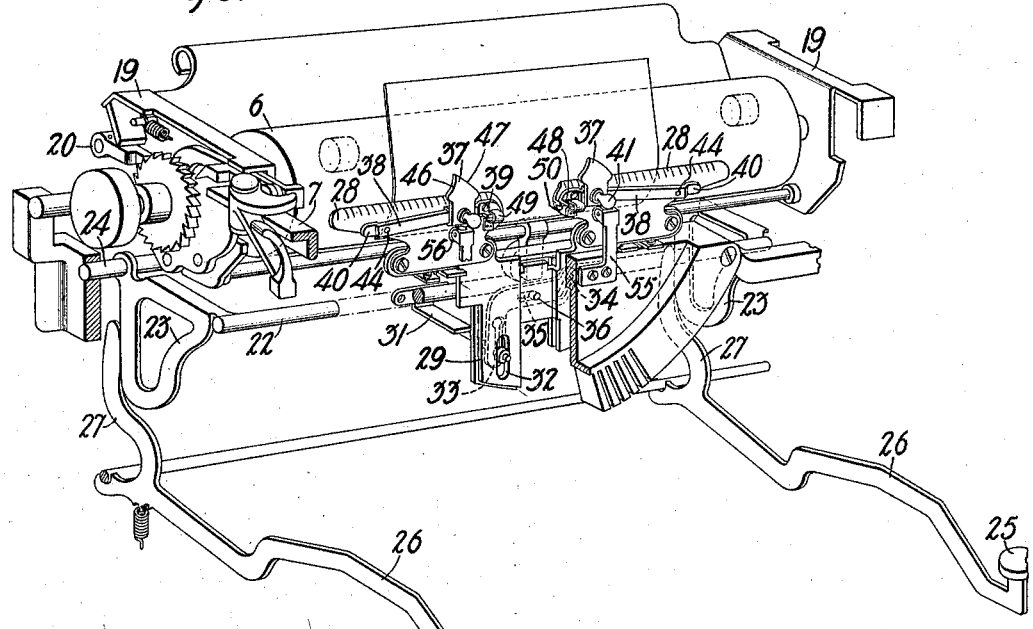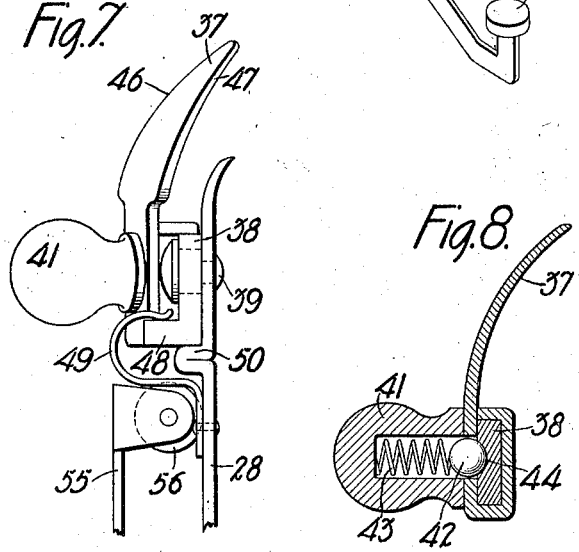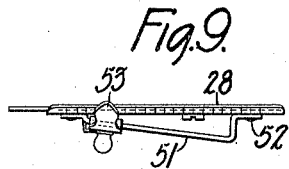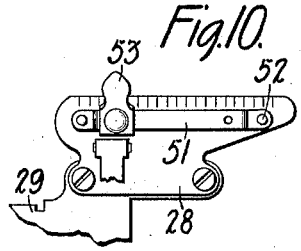

UNITED STATES PATENT OFFICE.

CORNELIUS B. CORCORAN, OF NEW YORK, N. Y., ASSIGNOR TO UNDERWOOD TYPE-WRITER COMPANY, OF NEW YORK, N. Y., A CORPORATION OF DELAWARE.

TYPE-WRITING MACHINE.

1,312,162.       Specification of Letters Patent.       Patented Aug. 5, 1919.

Application filed January 4, 1917. Serial No. 140,499.

*To all whom it may concern:*

Be it known that I, CORNELIUS B. CORCORAN, a citizen of the United States, residing in borough of the Bronx, in the county of the Bronx, city and State of New York, have invented certain new and useful Improvements in Type-Writing Machines, of which the following is a specification.

This invention relates to typewriting machines and more especially to mechanism for insuring the proper adjustment and maintenance of refractory work-members, such as stiff index cards or the like. This invention is an improvement on Patent No. 1,220,647 of March 27, 1917, and application No. 136,596, filed December 13, 1916.

In the patent and application above-mentioned, it has been shown that it is desirable to shift the combined gage and holder, which coöperates with the platen, at the same time that the platen is shifted to upper-case position, so that there will be substantially no relative vertical movement between them. In the application mentioned, it has been shown that it is desirable at times to have auxiliary work-members holding fingers projecting somewhat above the line of writing, so as to maintain stiff work-members in proper contact with the platen.

In the present case, an improved manner of adjusting the fingers toward and from their operative position in close juxtaposition to the platen is disclosed. This is done by slidingly mounting them on ways which incline toward each other and toward the platen. The fingers are provided with detents for locking them in either their operative or inoperative positions. It has been found for the ordinary size work-cards, the carriage would not naturally travel such a distance as to interfere with the fingers when they were up in their operative positions. However, when the paper fingers are in their outer inoperative positions and moved to their upper-case positions with the gage and holder on which they are mounted, they will come into the path of the sides of the carriage as the latter moves to the extremes of its travel. The mounting, therefore, of the fingers, in one form of the device, is made so that they can yield when cammed down, by engagement with the sides of the carriage, to a position permitting the carriage to pass without damage to any of the parts of the mechanism. In the preferred form of the invention, this is done in such a way that the fingers will immediately resume their upper and active positions on the passage of the sides of the carriage out of register with the fingers.

Other features and advantages will hereinafter appear.

In the accompanying drawings,

Figure 1 is a vertical section taken from front to rear with parts omitted to simplify the showing.

Fig. 2 is a fragmentary detail view showing the left-hand side of the carriage in the act of depressing one of the fingers when the carriage is moving to its extreme right-hand position, the paper-finger itself being shown at the outer end of the lever on which it is mounted and which forms one of the ways for permitting its adjustment toward and from the platen and the work-member on the platen for which it is used. The dotted line position shows the normal raised position of the work-fingers and the full lines of the depressed position. In either case, however, the work-finger is in its inoperative position. The platen, scale and finger are shown in upper-case positions.

Fig. 3 is a fragmentary view taken from the front with parts broken away to show the underlying structure. In this view the fingers are shown in their innermost active positions and also in their raised positions with respect to the wing scale on which they are mounted. The platen, gage and holder, and the fingers are shown in their lower-case positions.

Fig. 6 is a skeleton perspective view showing the relation of the case-shift mechanism to the work-member holding and guiding means, the parts being shown in their lower-case positions.

Fig. 7 is an enlarged detail edge view of one of the fingers showing it in its active position.

Fig. 8 is an enlarged vertical section showing the manner of mounting one of the fingers on its guiding and supporting lever, and also the locking means for yieldingly maintaining it in its active and inactive position.

Figs. 9 and 10 are plan and elevation views respectively of a modified form of finger mounting.

Figure 3:
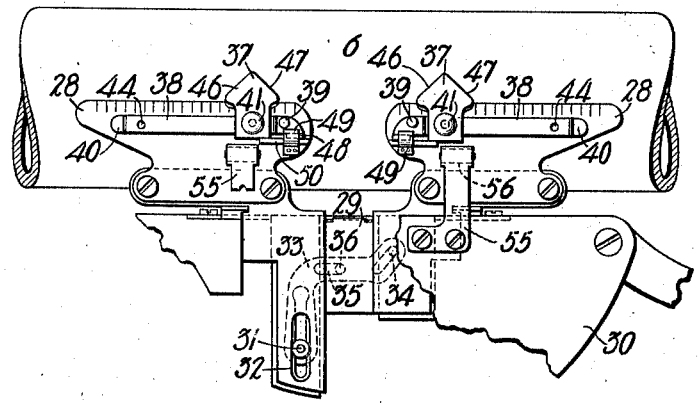

Alphabet keys 1 and numeral keys 2, depress key levers 3 to rock bell cranks 4, to swing type-bars 5 up rearwardly against the front side of a platen 6 mounted on a carriage 7. The carriage 7 is mounted on ways 9, whereby it may have a step-by-step traveling movement under the control of the escapement mechanism indicated generally at 10. This escapement mechanism includes a rack 11, pivotally mounted on the carriage and engaging a pinion 12, controlled by an escapement wheel 13, which in turn is controlled by a pair of fixed and movable pawls 14, operated by a universal bar 15, the latter being operated by heels 16, one of which is provided on each of the type-bars 5. This provides for the step-by-step advancing movement of the platen and carriage as the alphabet and numeral keys are operated in succession.

Each of the type-bars 5 is provided with two types 17 and 18, so that either one or another set of characters can be used as desired. The types 17 represent the lower-case characters and are normally in use, while the types 18 represent upper-case characters including capitals which may be used when desired. The change from one case of types to the other case is effective by a shifting movement of the platen 6. For this purpose the platen 6 is mounted on an inner carriage or frame 19, which, in turn, is mounted for vertical movement by means of a pair of swinging arms 20, and further by means of rollers 21, traveling on a shift rail 22. The shift rail 22 forms part of a shift-frame 23, mounted to swing about the axis of a shaft 24 as a center. In order to rock the shift frame 23, there are provided two shift keys 25, one of which may be temporary and the other semi-permanent as to their action. When one of the shift keys is depressed, it rocks downwardly a lever 26, to rock forwardly an arm 27, engaging the back of the shift frame 23.

While the movement of the shift frame 23 is a swinging one, the peculiar mounting of the inner frame 19 is such that the platen or at least the front element thereof forming the line of printing will have a substantially vertical movement. The movement of the platen 6 to upper-case position brings the line of printing to a position, such that when the type-bars 5 come up to strike, the upper-case types 18 will hit the work-member on the platen.

Patent No. 1,220,647, above-mentioned, shows how a pair of combined work-holders and wing scales 28 could be adjusted with the platen from lower to upper-case position, so as to have the same vertical movement always maintaining the edge of the scales or gage, which coöperates with the platen in holding the work-member thereon in the same vertical relation with respect to the platen, although the latter may travel relatively to the former. This consists in mounting the wing scales 28 on a common supporting plate 29 itself guided for vertical movement by means of the type-bar segment 30 with minor attachments thereto. The movement of the wing scales 28, which together may be termed a gage and holder, is obtained from the shift frame 23 by attaching a bracket or arm 31, to the shift rail 22. This arm 31 extends forwardly through a slot 32, in the plate 29, where it engages one end of a camming lever 33, pivotally mounted at 34, by means of a pin-and-slot arrangement. The lever 33 is provided intermediate its ends with a cam slot 35, to engage a pin 36, provided on the plate 29, on which both of the wing scales 28 are mounted.

It will thus be seen that when the shift rail 22 moves upwardly to effect a change of the platen 6 to its upper-case position, the wing scales 28 will be moved with the platen substantially the same amount as the front element of the platen cylinder, allowance being made by the peculiar arrangement of the lever 33 for the difference in the swinging movement of the shift frame 23 and the vertical movement of the printing line of the platen.

The wing scales are caused to yieldingly grip the platen at their upper edges in both lower and upper-case positions by a pair of leaf springs 55, having an anti-friction engagement with the wings by means of rollers 56.

Figure 4:
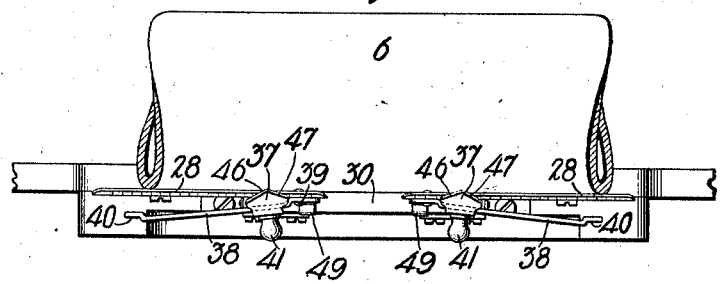
Fig. 4 is a top plan view of parts shown in Fig. 3, and in substantially the same relation.
Figure 5:
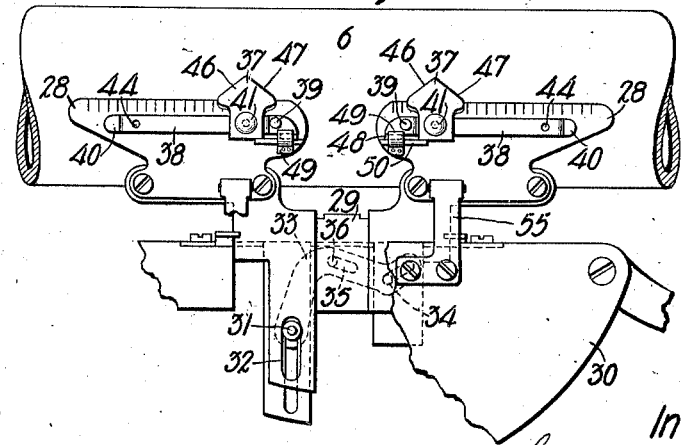
Fig. 5 is a view similar to Fig. 3, except that the platen and the work-member guiding and holding means are in their upper-case positions.

While the upper edges of the wing scales 28 coöperate with the platen in holding a work-member snug on the platen, at the line of writing, in the case of refractory work-members, such as stiff or springy cards, it is desirable to guide and hold the work-member on the platen at points somewhat above the line of printing. To do this, there are provided a pair of fingers 37, which when in their operative positions, shown in Figs. 1 and 3 to 7, warp the work-member to the platen at and above the line of printing. The fingers 37 are wrapped around levers 38 which are pivotally mounted on the wing scales at 39. The fingers may be slid from their innermost active positions, as seen in Figs. 1 and 3 to 7, to their outermost inactive positions farthest away from each other.

The peculiar form of the levers 38 and the mounting of the fingers 37 thereon enable this shifting between active and inactive positions. That is to say, the levers 38, are closest to the wing scales and the platen at their printing point ends, and flare or incline forwardly toward their outer ends and toward the ends of the platen. This forms outwardly and forwardly inclined ways which carry the fingers farther and farther away from the platen as they are moved away from the printing point. The outer ends of the levers or ways 38 are bent inwardly at 40 to prevent the fingers from slipping off the ends of the levers.

In order to lock the fingers in either position of adjustment, their handles 41 are hollowed out to form a housing for spring detents, each comprising a ball 42 and a spring 43. The balls 42 fit in corresponding sockets 44 and 45 provided at opposite ends of each of the ways or levers.

In the preferred form of the invention, provision is made for permitting a depression of the fingers 37, especially when in their upper-case positions, so that the frame of the carriage 7, as indicated in Fig. 2, can cam the fingers to an ineffective and obstructive position. To do this, as stated above, the fingers are pivotally mounted at their inner ends and their outer ends are free to move vertically. The fingers 37 are apexed by cam sides 46 and 47 which enable the gradual depression of the fingers and the levers, on which they are mounted, when the carriage frame 7 comes into engagement with the fingers. In order to normally hold the fingers in their raised positions, the inner ends of the levers are each provided with a lug 48 engaged by a spring 49 mounted on the associated wing scale 28. Shelves 50, formed on each of the wing scales 28, limit the return positions of the levers and fingers under the traction of the springs 49. These shelves 50 also form supports on which the fingers 37 rest when in their active positions to hold them firmly to their work.

Where it is possible to cut away the carriage frame to prevent a clash between the fingers and the carriage frame in passing each other, a modified form may be used, as shown in Figs. 9 and 10. In this case, the mountings 51 for the fingers 53 are no longer levers, but merely ways, being fixed at their outer ends 52, as well as at their inner ends. They incline forwardly and outwardly, however, the same as the levers 38, so that the fingers indicated at 53 may be slidingly adjusted in the same manner between operative and inoperative positions. In such a case, the ends of the fingers 53 need not be formed with extensive cam sides as in the case of the fingers 37.

Variations may be resorted to within the scope of the invention, and portions of the improvements may be used without others.

Having thus described my invention, I claim:

1. The combination with a main typewriter frame and a traveling carriage frame, of a platen mounted on said carriage for case-shift movement, a work-member holder on said main frame but moving with said platen from a normal lower case position to an upper-case position which will lie in the path of the movement of said carriage frame, and a depressible mounting for said holder enabling said holder to be cammed down bodily out of the way by said carriage frame.

2. The combination with a main typewriter frame and a traveling carriage including a platen, of a gage and holder mounted on said main frame and coöperating with said platen to assure the proper adjustment of a work-member on said platen, and a finger projecting above said gage and holder to aid in maintaining the work-member in proper position on said platen, said finger being yieldingly mounted to automatically clear said carriage as it passes by the same.

3. The combination with a main typewriter frame and a traveling carriage including a platen, of a gage and holder mounted on said main frame and coöperating with said platen to maintain a work-member in the proper adjustment on said platen, a finger projecting above said gage and holder to aid in maintaining the work-member in proper position on said platen, means to enable said finger to automatically clear said carriage as it passes by the same, and spring means returning said finger to a raised position when said carriage has passed out of the way.

4. The combination with a main typewriter frame and a traveling carriage including a platen, of a gage and holder mounted on said main frame and coöperating with said platen to enable the proper adjustment of a work-member on said platen, and a finger to coöperate with said platen to form an additional means for maintaining a work-member on said platen, said finger adapted to be manually settable to either of two positions, and also independently yielding to permit it to clear the carriage.

5. The combination with a main typewriter frame and a traveling carriage including a platen, of a gage and holder mounted on said main frame and coöperating with said platen, to enable the proper adjustment of a work-member on said platen, and a finger both slidingly and pivotally mounted on said gage and holder so as to be movable in two ways, between operative and inoperative positions with respect to said platen.

6. The combination with a platen, of a combined gage and holder coöperating with said platen to insure the proper adjustment of a work-member on said platen, a lever pivotally mounted on said gage and holder, a finger mounted on said lever and coöperating to maintain the work-member properly on the platen, a carriage for said platen traveling across the position of said finger, and moving the same to a cleared position, and a spring for automatically returning said finger to its normal position.

7. The combination with a carriage, of a platen rotatably mounted on said carriage, a finger coöperating with said platen to maintain a work-member properly on said platen, and ways on which said finger is slidably mounted having an angle of inclination to the axis of rotation of said platen, so that said finger may be moved toward and from said platen by a horizontal movement with respect to said platen.

8. The combination with a platen, of a support inclined to the axis of said platen so that one end of the support is nearer to the platen than the other, a finger adapted to hold a work-member on said platen, said finger having a channel engaging said support, so that said finger may be slidingly moved along said support from the ineffective position remote from the platen to the effective position near said platen, a handle for said finger, and a detent holding said finger in operative and inoperative position.

9. The combination with a platen, of a finger coöperating with said platen, a lever for supporting said finger, a pivotal mounting for said lever, a rest for said lever, a spring normally maintaining said lever in engagement with said rest, said finger having a sliding movement relative to said lever, and means for locking said finger in a plurality of positions along said lever.

10. The combination with a platen, of a pair of wing scales coöperating with said platen to make the proper adjustment for work-members on said platen, a pair of ways mounted on said wing scales, inclining inwardly toward each other and toward the axis of the platen, and a pair of fingers for assisting in maintaining a work-member properly on said platen slidably mounted on said ways, so as to be operative when nearest to each other and inoperative when farthest spread apart.

11. The combination with a platen, of a pair of ways or levers inclining inwardly at an angle to the axis of said platen and to each other, pivotal mounting for said levers at their inner ends, and fingers for adjusting the work-member in proper position on said platen, slidably mounted so as to be movable from active position when nearest to each other, to inactive position when spread apart from each other and from said pivots.

12. The combination with a carriage, of a platen mounted on said carriage, a finger coöperating with said platen to maintain a work-member in proper position on the platen, a slide forming a mounting for said finger enabling a movement of the same between operative and inoperative positions, a pivot on which said slide is mounted for permitting a yielding of the finger to clear the carriage, a spring normally supporting said slide and an abutment for holding said slide to keep said finger firmly in engagement with the work-member on the platen.

13. In a front-strike typewriting machine, the combination with a traveling carriage including a platen, and a shift frame therefor, of a type-bar segment, a paper-gage sliding on said segment, a connection from said shift frame whereby the gage shifts with the shift frame, a work-holding finger, and a slide on said gage for said finger along which it may slide to move it radially to and from the platen.

CORNELIUS B. CORCORAN.

Witnesses:
ARTHUR A. JOHNSON,
JENNIE P. THORNE.